United States Patent [19]

Suzuki et al.

[11] Patent Number: 4,991,009
[45] Date of Patent: Feb. 5, 1991

[54] DYNAMIC IMAGE TRANSMISSION SYSTEM

[75] Inventors: Koichi Suzuki, Yokohama; Noboru Murayama, Machida, both of Japan

[73] Assignee: Ricoh Company, Ltd., Japan

[21] Appl. No.: 376,861

[22] Filed: Jul. 7, 1989

[30] Foreign Application Priority Data

Jul. 8, 1988 [JP] Japan ............................ 63-168961
Jul. 8, 1988 [JP] Japan ............................ 63-168962

[51] Int. Cl.$^5$ .............................................. H04N 7/12
[52] U.S. Cl. ........................................ 358/135; 358/85;
358/105; 358/136; 379/53
[58] Field of Search ................ 358/85, 133, 135, 136; 379/53

[56] References Cited

U.S. PATENT DOCUMENTS

| | | | |
|---|---|---|---|
| 4,494,144 | 1/1985 | Brown | 358/85 |
| 4,703,348 | 10/1987 | Yuasa | 358/85 |
| 4,774,574 | 9/1988 | Daly | 358/85 |
| 4,827,339 | 5/1989 | Wada | 358/85 |

FOREIGN PATENT DOCUMENTS

144914 12/1977 Japan .

Primary Examiner—Howard W. Britton
Attorney, Agent, or Firm—Mason, Fenwick & Lawrence

[57] ABSTRACT

A dynamic image transmission system comprises an input part for inputting image data of an input image, memory for storing the image data successively input from the input part and for storing transmitting image data which is to be transmitted, a detecting part for detecting each dynamic line in which corresponding picture element data of two successive frames stored in the memory differ by more than a predetermined data change quantity, a transmission part for transmitting the image data stored in the memory to a transmission path as the transmitting image data, and control part for controlling operations of the detecting part and the transmission part during an image transmission mode so that image data related to a first frame of the input image is transmitted as the transmitting image data but only the image data of each dynamic line is transmitted as the transmitting image data with respect to second and subsequent frames.

24 Claims, 8 Drawing Sheets

DYNAMIC IMAGE TRANSMISSION SYSTEM

BACKGROUND OF THE INVENTION

The present invention generally relates to dynamic image transmission systems, and more particularly to a dynamic image transmission system which transmits a dynamic image (motion picture or moving picture) using a transmission path having a low data transmission rate and is suited for application to a video phone, a video conference system and the like.

When describing a dynamic image, it is necessary to transmit several still images per unit time. A large number of still images must be transmitted per unit time in order to smoothly describe a dynamic image which includes a quick movement, and in this case, a wide frequency band is required to transmit the image data. Hence, as a system of efficiently transmitting the dynamic image, there conventionally is a so-called interlace scanning system which roughly scans one image a plurality of times and increases an apparent repetition frequency without increasing the transmission band width. The NTSC system employed in television broadcasting and video equipments is well known as an example of the interlace scanning system.

When a change in the object image is relatively gradual, a narrow band television system proposed in a Japanese Laid-Open Patent Application No. 52-144914 samples the image along a scanning line by a flying spot to obtain the image data. The image data is transmitted to a receiver side which successively corrects parts of the image data so as to obtain a reproduced image which follows the gradual change in the object image.

The NTSC system is a dynamic image transmission system which has a large band compression effect but is unsuited to a transmission path which has a low data transmission rate such as a telephone line.

On the other hand, the proposed narrow band television system has a large band compression effect but has a low data compression effect because the entire picked up image is constantly transmitted at a long time rate. For this reason, the proposed narrow band television system cannot be used when the movement in the object image is quick.

According to the conventional systems, the entire picked up image is constantly transmitted repeatedly in conformance with a predetermined procedure regardless of whether the interlace scanning or the non-interlace scanning is employed.

As a result, the receiver side must count the number of data with reference to a synchronizing signal for the purpose of identifying the corresponding positional relationships of the received data. In addition, unnecessary data are included in the transmitted data because the data of the entire image are transmitted regardless of whether or not the image changes, that is, a movement occurs in the image. For this reason, the data compression efficiency is poor and is unsuited for the transmission of the image which includes a quick movement.

SUMMARY OF THE INVENTION

Accordingly, it is a general object of the present invention to provide a novel and useful dynamic image transmission system in which the problems described above are eliminated.

Another and more specific object of the present invention is to provide a dynamic image transmission system comprising input means for inputting image data of an input image, memory means for storing the image data successively input from the input means and for storing transmitting image data which is to be transmitted, detecting means for detecting each dynamic line in which corresponding picture element data of two successive frames stored in the memory means differ by more than a predetermined data change quantity, transmission means for transmitting the image data stored in the memory means to a transmission path as the transmitting image data, and control means for controlling operations of the extracting means and the transmission means during an image transmission mode so that image data related to a first frame of the input image is transmitted as the transmitting image data but only the image data of each dynamic line is transmitted as the transmitting image data with respect to second and subsequent frames. According to the dynamic image transmission system of the present invention, it is possible to considerably reduce the quantity of the image data which is to be transmitted even when the image to be transmitted is dynamic, that is, the image includes a movement. For this reason, it is possible to transmit a dynamic image which includes a quick movement in a transmission path which has a low data transmission rate such as a telephone line.

Other objects and further features of the present invention will be apparent from the following detailed description when read in conjunction with the accompanying drawings.

DESCRIPTION OF THE PREFERRED EMBODIMENTS

Figure 1:
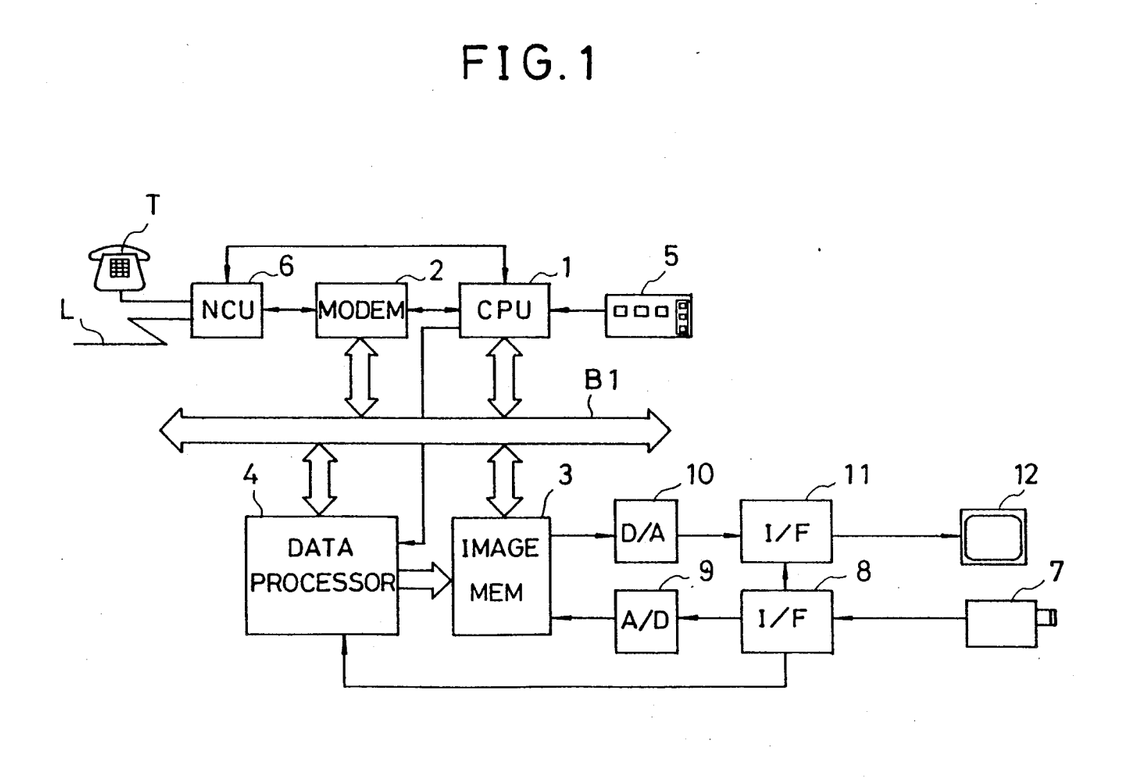
FIG. 1 is a system block diagram showing a first embodiment of a dynamic image transmission system according to the present invention.

FIG. 1 shows a first embodiment of a dynamic image transmission system according to the present invention. In this embodiment, the dynamic image transmission system is applied to a video phone.

In FIG. 1, a central processing unit (CPU) 1, a modem 2, an image memory 3, and a data processor 4 are connected to a main bus B1. The CPU 1 is controlled in response to commands entered from a keyboard 5. The modem 2 is coupled to a telephone set T and a telephone line L via a network control unit (NCU) 6. The image memory 3 is supplied with and stores a video signal output from a camera 7 via a camera interface 8 and an analog-to-digital (A/D) converter 9. On the other hand, the stored image data in the image memory 3 is supplied and displayed on a display 12 via a digital-to-analog (D/A) converter 10 and a television interface 11.

Figure 2:
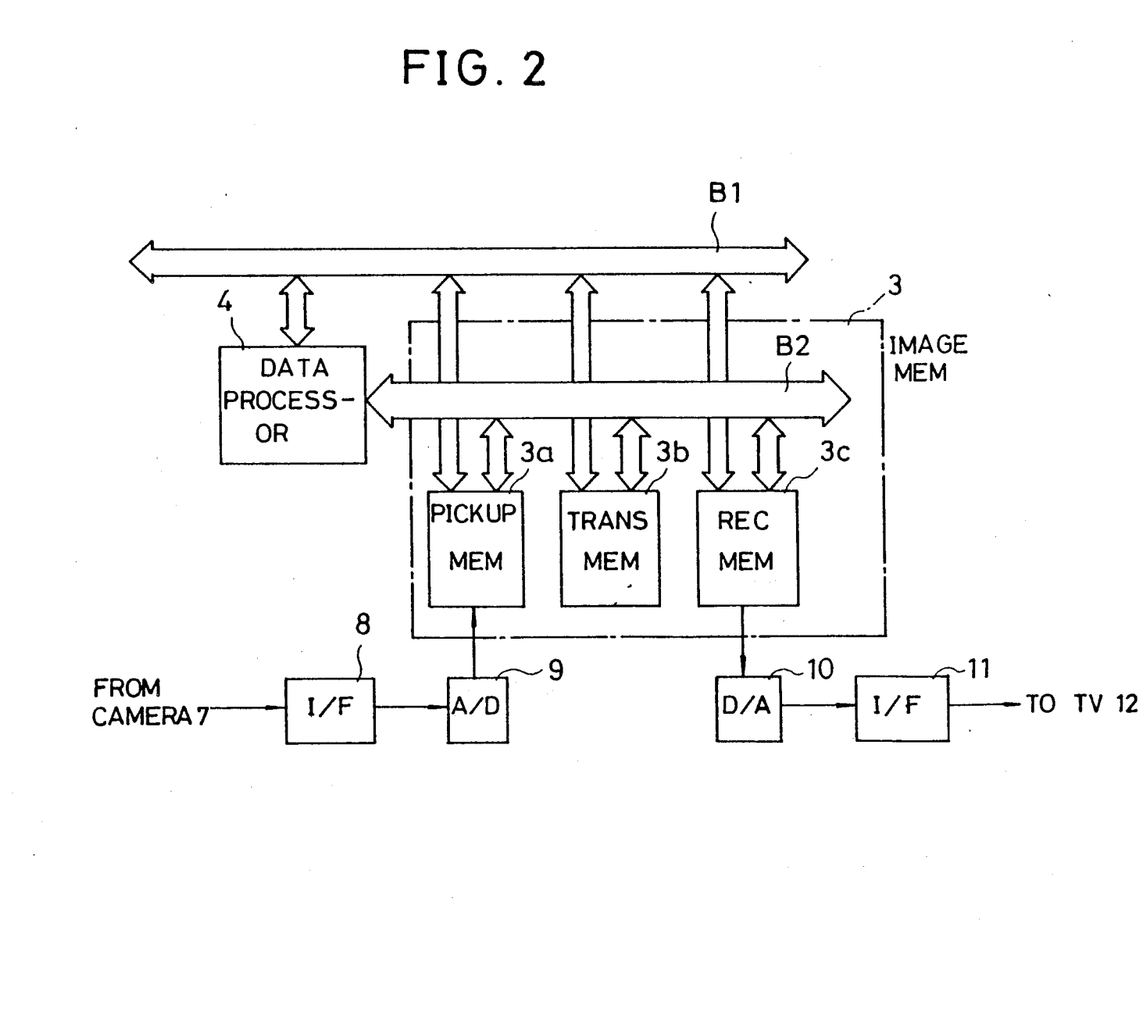
FIG. 2 is a system block diagram showing an embodiment of an image memory shown in FIG. 1 together with related parts.

FIG. 2 shows an embodiment of the image memory 3 shown in FIG. 1 together with related parts. The image memory 3 has a pickup memory 3a, a transmission memory 3b, and a reception memory 3c which are connected to both the main bus B1 and an image bus B2. The pickup memory 3a, the transmission memory 3b, and the reception memory 3c are coupled to the data processor 4 via the image bus B2. The pickup memory 3a receives image data from the A/D converter 9, and the reception memory 3c supplies image data to the D/A converter 10. Since the read out operation of the image memory 3 is carried out with a timing independent of the data renewal, a dual port memory is used for the image memory 3.

Figure 3A:
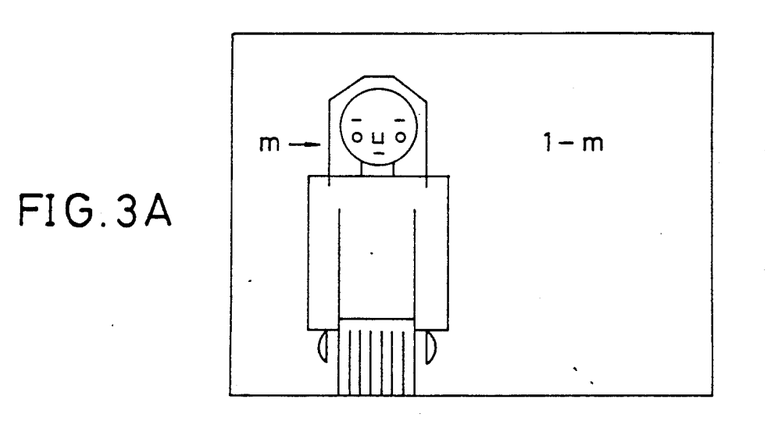
FIGS. 3A and 3B respectively are diagrams for explaining an image transmission.
Figure 3B:
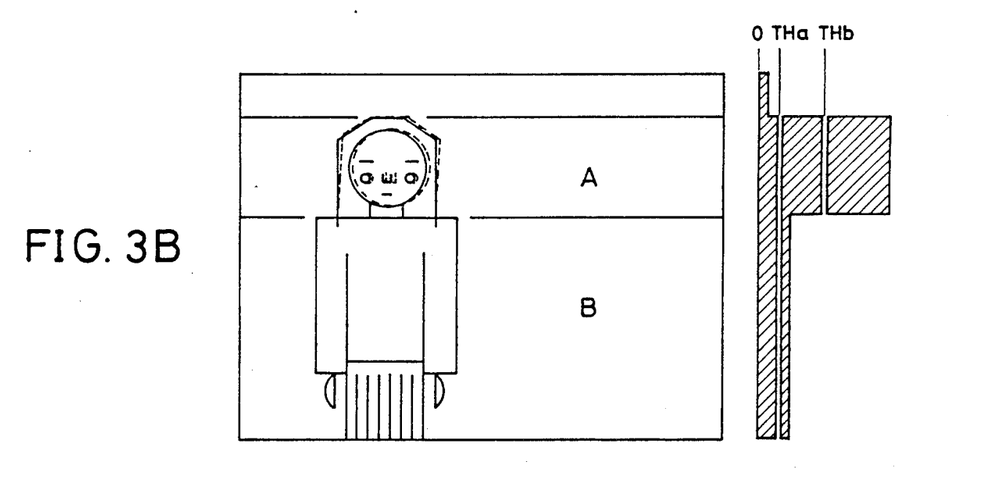

FIGS. 3A and 3B respectively are diagrams for explaining an image transmission. FIG. 3A shows an image which is transmitted first and FIG. 3B shows an image which is transmitted thereafter. In FIG. 3A, m denotes a maximum dynamic region (area) rate which is normally in the order of 0.2 when it is assumed that a number of picture elements constituting the entire image is one. Hence, a minimum background region (area) rate $1-m$ is in the order of 0.8.

A histogram is shown on the right of the image in FIG. 3B. This histogram has as the parameter a number of changing picture element data which is determined by comparing each of the corresponding picture element data of the image data transmitted for every frame. As may be seen from the histogram, the person in the image which is transmitted by the video phone is the main dynamic object. Particularly the face portion within a region A changes with short intervals, and the eyes and mouth undergo the most change. On the other hand, the image undergoes virtually no change within a region B. The present invention takes note of this characteristic and achieves a high image (data) compression efficiency by transmitting only the image data within the dynamic region According to the present invention, scanning lines in which a data change quantity exceeds a predetermined level are detected as dynamicscanning lines. When a number of such dynamic scanning lines exceeds a predetermined number, the entire image is treated as a totally dynamic image. On the other hand, when the number of dynamic scanning lines is less than or equal to the predetermined number, the image is treated as a partially dynamic image and only the dynamic scanning lines are treated as a dynamic image.

Next, a description will be given of the operation of the first embodiment of the dynamic image transmission system. The camera 7 picks up an object and outputs a video signal which is supplied to the A/D converter 9 via the camera interface 8. The A/D converter 9 converts the video signal into a digital image data at a rate of 30 frames per second and a sampling rate of 256×256 picture element data per frame. The digital image data is stored in the pickup memory 3a. The output of the camera interface 8 is also supplied to the television interface 11. Hence, it is possible to selectively display and monitor on the display 12 the received image data which is stored in the reception memory 3c or the transmitting image data.

When an image transmission instruction is entered from the keyboard 5 and supplied to the CPU 1, a first frame of the image data which is picked up by the camera 7, that is, the image shown in FIG. 3A, is compressed in the data processor 4 under the control of the CPU 1. The data processor 4 compresses the first frame of image data for every line and adds a line identification code. For example, a known one-dimensional data compression system such as the difference pulse code modulation (DPCM), the adaptive difference pulse code modulation (ADPCM) and the adaptive discrete cosine transform (ADCT) may be employed as the data compression system. The compressed image data from the data processor 4 is converted into a voice grade signal in the modem 2. The voice grade signal is output to the telephone line L via the NCU 6 in the sequence of the line numbers in an non-interlace. At the same time, an image data identical to the transmitting image data is stored in the transmission memory 3b.

The NCU 6 normally connects the telephone line L to the telephone set T. However, during the image data transmission, the NCU 6 disconnects the telephone line L from the telephone set T and connects the telephone line L to a data transmission circuit (not shown) within the NCU 6. In addition, prior to the data compression, the data of two mutually adjacent lines are compared. When the difference between the data of the two mutually adjacent lines is small and an absolute value accumulation of the differences of the corresponding picture element data does not reach a predetermined level, the two mutually adjacent lines are considered identical. In this case, only a no-change code is transmitted together with the line identification code.

After the image data of the first frame is transmitted as a still image, the image data of the next frame is entered. The image data of the next frame is successively received in sequence from the picture element data of the top left picture element of the image. Hence, each picture element data received is compared with the picture element data of the previous frame stored at a corresponding address of the transmission memory 3b while rewriting the content of the pickup memory 3a. Between the corresponding picture element data of the two successive frames, a number of picture element data which changed is counted for every line so as to make the histogram shown in FIG. 3B which is in terms of each line. The picture element data which undergoes a change will hereinafter be referred to as a dynamic picture element data. A line which includes more than a predetermined quantity of dynamic picture element data is regarded as a dynamic line, and a number of dynamic lines is counted so as to obtain a dynamic ratio of the dynamic lines with respect to all the lines making up the image (frame). When this dynamic ratio exceeds a predetermined value, the entire image is treated as a totally dynamic image. But when the dynamic ratio is less than or equal to the predetermined value, the image is treated as a partially dynamic image. The totally dynamic image and the partially dynamic image are transmitted in mutually different transmission modes.

In a totally dynamic mode, the image data amounting to one frame is transmitted by a predetermined interlace. When a ⅛ interlace is used as the predetermined interlace, for example, eight picked up image frames correspond to one transmission frame. When the input video signal from the camera 7 is received by a ⅛ interlace, four picked up image frames correspond to one transmission frame.

On the other hand, in a partially dynamic mode, a continuous region which includes the dynamic lines is defined as a dynamic region and only the image data within this dynamic region is transmitted by a predetermined interlace. The conditions of this predetermined interlace may be identical to those of the interlace used in the totally dynamic mode. However, when the dynamic region is small, it is possible to make one picked up image frame correspond to one transmission frame.

When the detected dynamic region can be divided into groups having mutually different dynamic ratios, it is possible to independently set the conditions of the interlace depending on the dynamic ratio. In this case, it is possible to detect the dynamic ratio from the data change quantity (number of dynamic picture element data) and classify the groups into a first group which has a dynamic ratio greater than a predetermined value and a second group which has a dynamic ratio less than or equal to the predetermined value. For example, the first group includes one or a plurality of regions in which quick changes (movements) occur and the histogram level exceeds a level THb shown in FIG. 3B, and the second group includes one or a plurality of regions in which gradual changes (movements) occur and the histogram level exceeds a level THa. Two frames of the image data within the region in the first group are transmitted by a ⅛ interlace while one frame of the image data within the region in the second group is transmitted by a ¼ interlace, for example.

The data processor 4 includes a buffer memory for temporarily storing the transmitting image data, so that it is possible to make an efficient data transmission regardless of the processing speed and transmission rate. In addition, the data processor 4 also includes a memory for storing accumulated values of the number of dynamic picture element data and the data change quantity for every line for the purpose of generating the histogram.

On the receiver side, the image data which is received via the NCU 6 is demodulated in the modem 2 and the data processor 4 restores the original image data in conformance with the transmission mode. Every time the image data is received, the data processor 4 refers to the line identification code within the data and subjects the image data to a data expansion so as to obtain the restored image data. The restored image data is used to renew the image data within the reception memory 3c at only the address of the designated dynamic region. The image data stored in the reception memory 3c is converted into an analog image signal by the D/A converter 10 and is further converted into a composite video signal by the television interface 11. The composite video signal is supplied to the display 12 which displays the image of the received image data.

Figure 4:
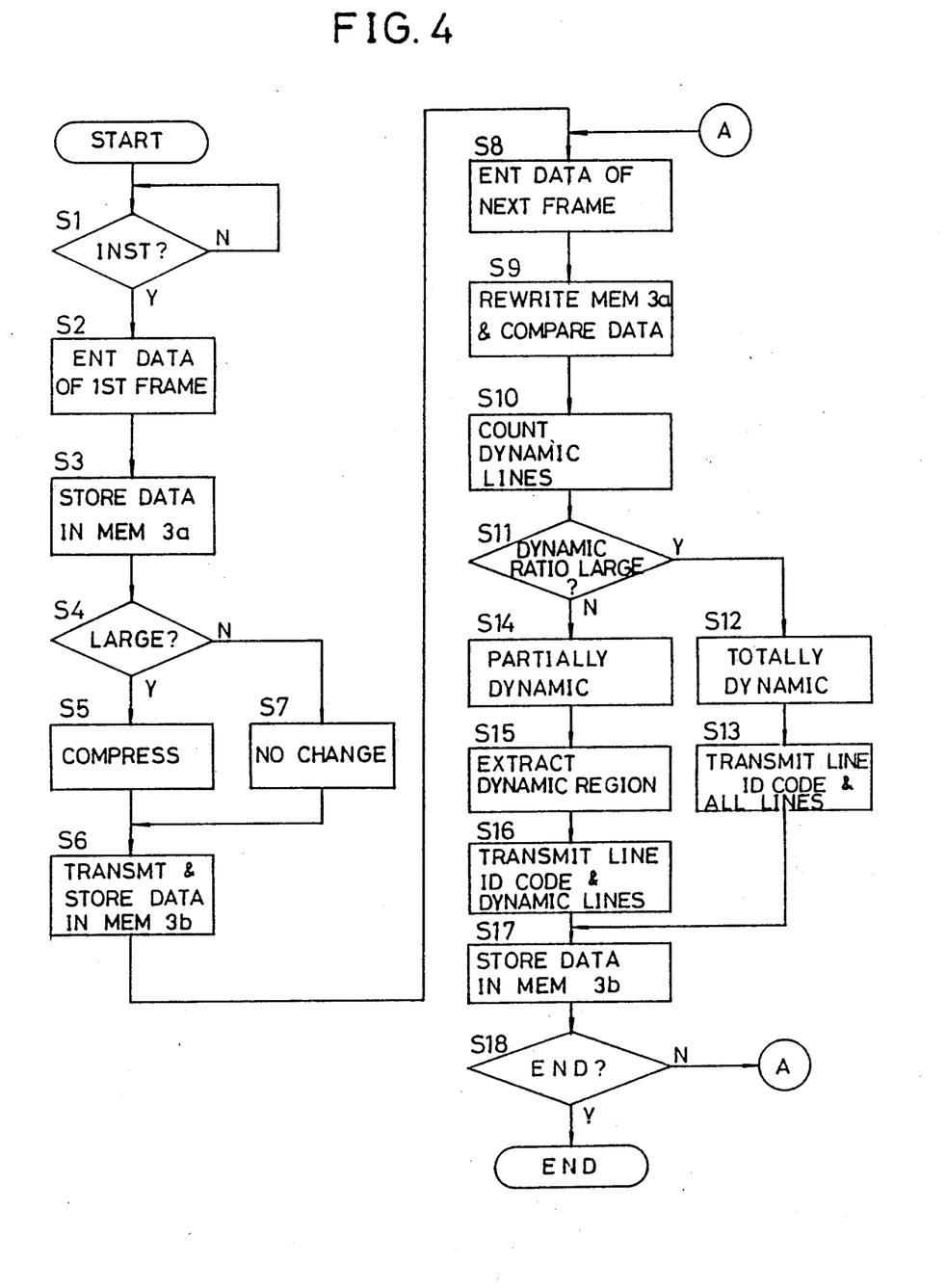
FIG. 4 is a flow chart for explaining an operation of a CPU shown in FIG. 1 during an image transmission mode in the first embodiment.

FIG. 4 shows a process of the CPU 1 shown in FIG. 1 during an image transmission mode in the first embodiment. In FIG. 4, a step S1 discriminates whether or not an image transmission instruction is received from the keyboard 5. When the discrimination result in the step S1 becomes YES, a step S2 enters the image data of the first frame and a step S3 stores the entered image data into the pickup memory 3a. A step S4 discriminates whether or not a difference between the data of two mutually adjacent lines is larger than the predetermined level, with respect to each of the lines of the entered image. A step S5 compresses in the data processor 4 the data of the lines which are considered different as a result of the discrimination in the step S4. In this case, a step S6 converts the compressed image data into the voice grade signal in the modem 2 and transmits the voice grade signal to the telephone line L via the NCU 6 together with the line identification code. The step S6 also stores the transmitting image data in the transmission memory 3b. On the other hand, when the discrimination result in the step S4 is NO, a step S7 generates a no-change code which is indicative of the discrimination result in the step S4 that the data of the two compared lines are considered identical. In this case, the step S6 transmits to the telephone line L only the no-change code together with the line identification code.

After the step S6, a step S8 enters the image data of a next frame. A step S9 rewrites the image data in the pickup memory 3a, and at the same time, compares the corresponding picture element data of the received image data and the image data stored in the transmission memory 3b. A step S10 counts the number of dynamic lines and obtains the dynamic ratio. A step S11 discriminates whether or not the dynamic ratio is greater than a predetermined value.

When the discrimination result in the step S11 is YES, a step S12 determines that the image (frame) is totally dynamic. A step S13 transmits the line identification code and the entire image data of the frame as the image data within the dynamic region to the telephone line L via the modem 2 and the NCU 6 by a first predetermined interlace. In other words, the image transmission is made in the totally dynamic mode. On the other hand, when the discrimination result in the step S11 is NO, a step S14 determines that the image (frame) is partially dynamic. A step S15 extracts the dynamic region in the partially dynamic image, and a step S16 transmits the line identification code and the picture element data within the extracted dynamic region to the telephone line L via the modem 2 and the NCU 6 by a second predetermined interlace. In other words, the image transmission is made in the partially dynamic mode. Then, a step S17 stores the received image data, that is, the picture element data of this next frame into the transmission memory 3b. A step S18 discriminates whether or not the image transmission is ended. When there is one or more frames to be transmitted, the discrimination result in the step S18 is NO and the process returns to the step S8. On the other hand, the process is ended when the discrimination result in the step S18 is YES. The first and second interlaces may be the same or different. Further, the picture element data (image data) within the dynamic region is transmitted by using both the interlace and a one or two dimensional data compression in this embodiment.

Figure 5:
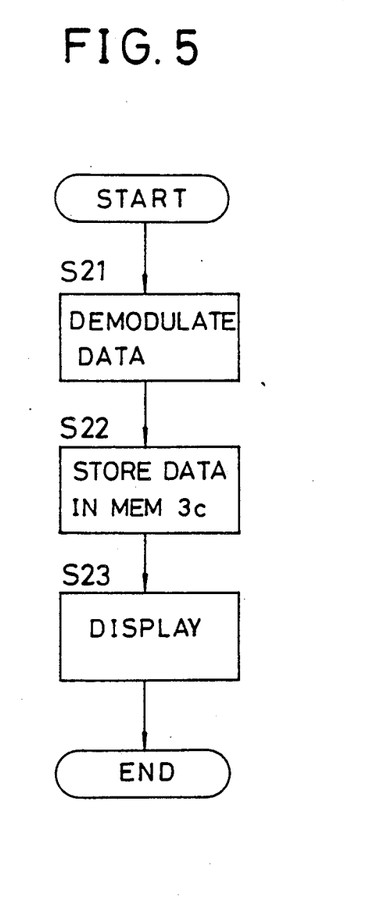
FIG. 5 is a flow chart for explaining an operation of the CPU shown in FIG. 1 during an image reception mode in the first embodiment.

FIG. 5 shows a process of the CPU 1 shown in FIG. 1 during an image reception mode in the first embodiment. In FIG. 5, a step S21 demodulates in the modem 2 the image data which is received via the telephone line L and the NCU 6, and restores the demodulated image data back into the original image data in conformance with the transmission mode in the data processor 4. Since the image data is compressed at the time of the image transmission in this embodiment, the restoration of the demodulated image data includes a data expansion using the line identification code. A step S22 stores the restored image data into the reception memory 3c. When storing the restored image data in the reception memory 3c, the restored image data (picture element data) is used to renew the image data already stored within the reception memory 3c at only the address of the designated dynamic region generated from the line identification code. A step S23 supplies the image data stored in the reception memory 3c to the display 12 via the D/A converter 10 and the television interface 11. As a result, the image of the received image data is displayed on the display 12 and the process is ended.

Next, a description will be given of a second embodiment of the dynamic image transmission system according to the present invention. The block system shown in FIG. 1 is also used in this embodiment.

In this embodiment, the dynamic lines are detected and the image data of the dynamic lines are compressed and transmitted together with the line identification code to the telephone line L. When transmitting the image data of the dynamic lines, the image data are transmitted sequentially with a predetermined priority. For example, the predetermined priority is the order of the consecutive line numbers or the order dependent on the size of the data change quantity of each dynamic line.

The reception process may be carried out similarly to the first embodiment, and a description thereof will be omitted.

Figure 6:
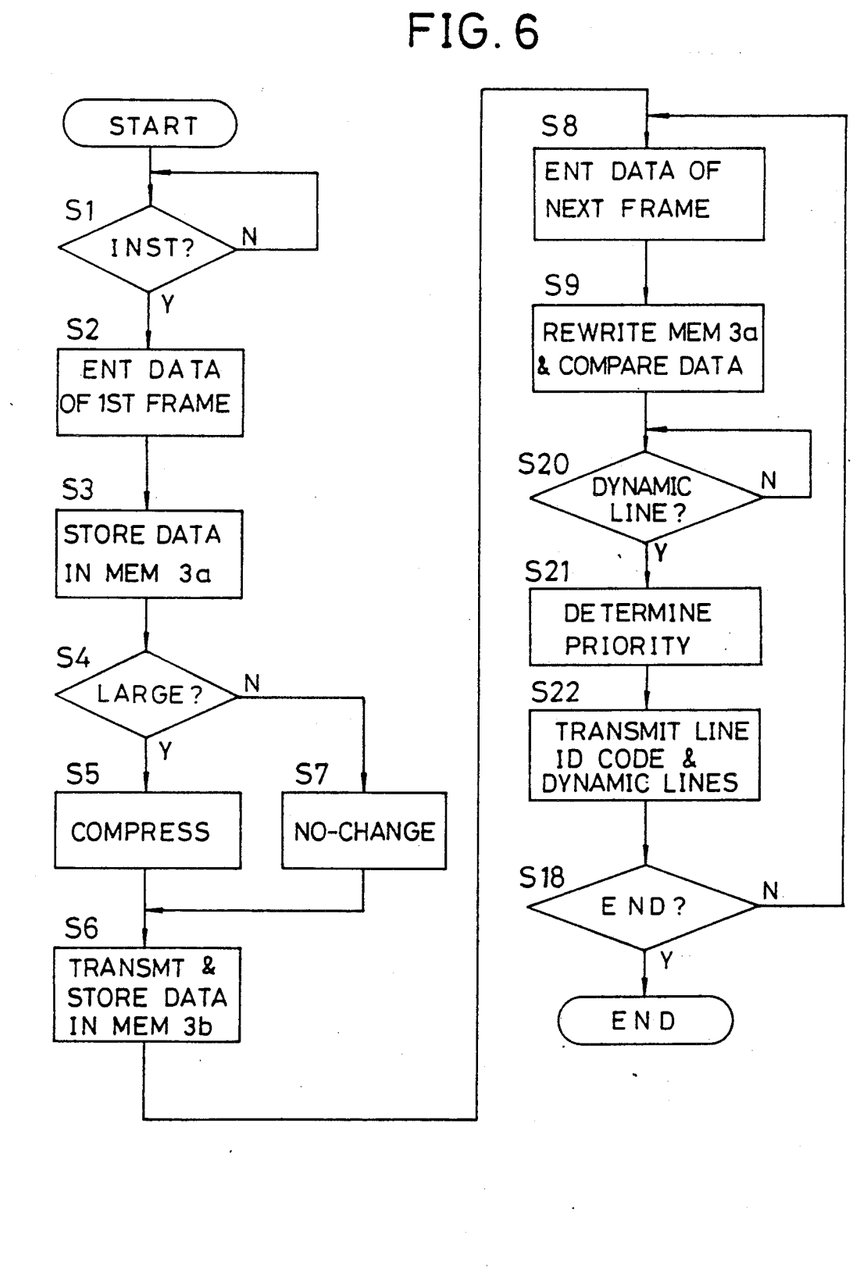
FIG. 6 is a flow chart for explaining an operation of a CPU shown in FIG. 1 during an image transmission mode in a second embodiment.

FIG. 6 shows a process of the CPU 1 shown in FIG. 1 during an image transmission mode in the second embodiment. In FIG. 6, those steps which are the same as those corresponding steps in FIG. 4 are designated by the same reference numerals, and a description thereof will be omitted. In FIG. 6, a step S20 discriminates whether or not each line is a dynamic line. The dynamic line may be detected similarly as in the first embodiment by making the histogram shown in FIG. 3B described before. When the discrimination result in the step S20 becomes YES a step S21 determines the predetermined priority with which the image data of the dynamic lines are to be transmitted. A step S22 transmits the line identification code and the image data of the dynamic lines with the predetermined priority to the telephone line L via the modem 2 and the NCU 6. As in the case of the first embodiment, it is possible to transmit the image data of the dynamic lines in different transmission modes depending on the data change quantity of each dynamic line. The step S23 discriminates whether or not the image transmission is ended.

Next, a description will be given of a third embodiment of the dynamic image transmission system according to the present invention. The block system shown in FIG. 1 is also used in this embodiment.

Figure 7:
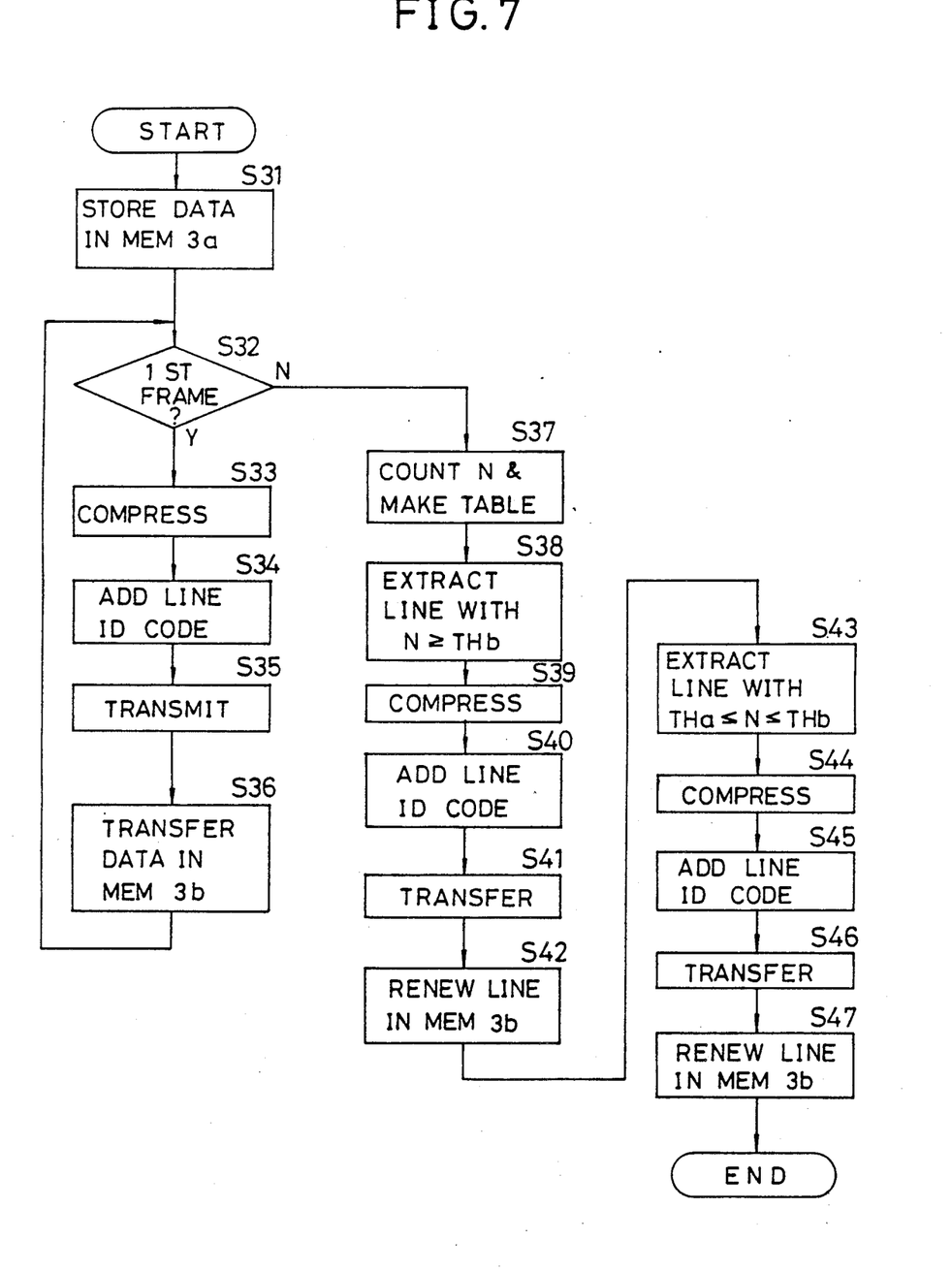
FIG. 7 is a flow chart for explaining an operation of a CPU shown in FIG. 1 during an image transmission mode in a third embodiment of the dynamic image transmission system according to the present invention.

FIG. 7 shows a process of the CPU 1 shown in FIG. 1 during an image transmission mode in the third embodiment. In FIG. 7, a step S31 enters an image data of a frame and stores the entered image data into the pickup memory 3a. A step S32 discriminates whether or not the image data relates to the first frame. When the discrimination result in the step S32 is YES, a step S33 compresses the image data for every line in the processor 4. A step S34 adds a line identification code to the compressed line data, and a step S35 transmits the compressed line data and the line identification code from the modem 2 to the telephone line L via the NCU 6 as the transmitting line data. Then, a step S36 transfers the transmitting line data in the transmission memory 3b, and the process returns to the step S32.

When the discrimination result in the step S32 is NO, a step S37 counts a number N of dynamic picture element data for each line and makes a table indicative of the correspondence of the number N and the line numbers. A step S38 extracts each line satisfying a relation $N \geq THb$. A step S39 compresses each extracted line, and a step S40 adds a line identification code to each compressed line. A step S41 transmits the compressed line data and the line identification code from the modem 2 to the telephone line L via the NCU 6 as the transmitting line data. A step S42 renews the transmitting line data in the transmission memory 3b.

A step S43 extracts each line satisfying a relation $THa \geq N < THb$. A step S44 compresses each extracted line, and a step S45 adds a line identification code to each compressed line. A step S46 transmits the compressed line data and the line identification code from the modem 2 to the telephone line L via the NCU 6 as the transmitting line data. A step S47 renews the transmitting line data in the transmission memory 3b, and the process ends.

Figure 8:
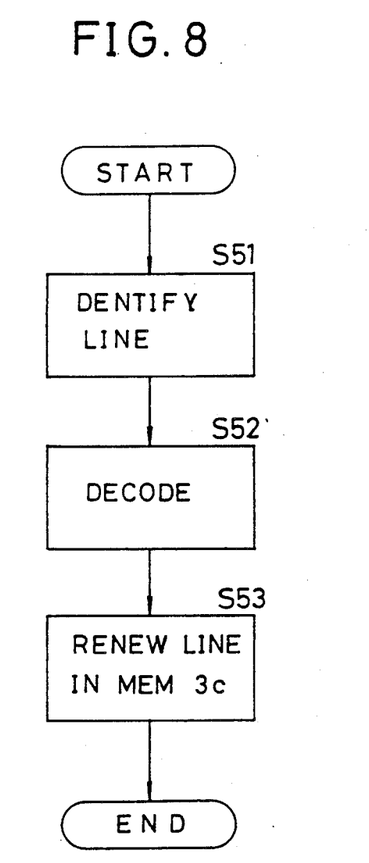
FIG. 8 is a flow chart for explaining an operation of the CPU shown in FIG. 1 during an image reception mode in the third embodiment.

FIG. 8 shows a process of the CPU 1 shown in FIG. 1 during an image reception mode in the third embodiment. In FIG. 8, a step S51 identifies each line from the image data which is received via the telephone line L and the NCU 6. A step S52 decodes the received data in the data processor 4. Since the image data is compressed at the time of the image transmission, the decoding of the received image data includes a data expansion using the line identification code. A step S53 renews the decoded image data in the reception memory 3c, and the process ends. As in the case of the embodiments described heretofore, the decoded image data (picture element data) is used to renew the image data already stored within the reception memory 3c at only the address of the designated dynamic region generated from the line identification code.

Further, the present invention is not limited to these embodiments, but various variations and modifications may be made without departing from the scope of the present invention.

What is claimed is:

1. A dynamic image transmission system comprising:
   input means for inputting image data of an input image;
   memory means for storing the image data successively input from said input means and for storing transmitting image data which is to be transmitted;
   detecting means for detecting each dynamic line in which corresponding picture element data of two successive frames stored in said memory means differ by more than a predetermined data change quantity;
   transmission means for transmitting the image data stored in said memory means to a transmission path as the transmitting image data; and
   control means for controlling operations of said detecting means and said transmission means during an image transmission mode so that image data related to a first frame of the input image is transmitted as the transmitting image data but only the image data of each dynamic line is transmitted as the transmitting image data with respect to second and subsequent frames;
   said transmission means transmitting the image data of each frame by an interlace dependent on a number of dynamic lines within the frame.

2. The dynamic image transmission system as claimed in claim 1 wherein said transmission means includes compression means for subjecting the transmitting image data to a predetermined data compression before transmission to the transmission path.

3. The dynamic image transmission system as claimed in claim 1 wherein said input means includes a camera for picking up the input image and for outputting the image data thereof.

4. The dynamic image transmission system as claimed in claim 1 wherein said transmission means includes a modem for modulating the transmitting image data.

5. The dynamic image transmission system as claimed in claim 1 which further comprises display means for displaying an image of the transmitting image data.

6. The dynamic image transmission system as claimed in claim 1 which further comprises a keyboard coupled to said control means for instructing the image transmission mode.

7. The dynamic image transmission system as claimed in claim 1 wherein the transmission path is a telephone line.

8. The dynamic image transmission system as claimed in claim 7 wherein said transmission means includes a network control unit which is connected to the telephone line.

9. The dynamic image transmission system as claimed in claim 1 wherein said transmission means transmits the image data of the dynamic lines with a predetermined priority.

10. The dynamic image transmission system as claimed in claim 9 wherein said predetermined priority is dependent on a data change quantity of the dynamic lines.

11. The dynamic image transmission system as claimed in claim 9 wherein said predetermined priority is dependent on a line number within the frame.

12. The dynamic image transmission system as claimed in claim 1 which further comprises reception means for receiving transmitting image data which is transmitted from a said transmission means of another dynamic image transmission system and received via the transmission path, said control means controlling operations of said reception means during an image reception mode so that the received transmitting image data is stored in said memory means with respect to the first frame and only the picture element data of each dynamic line is rewritten in said memory means with respect to the second and subsequent frames.

13. The dynamic image transmission system as claimed in claim 12 wherein said reception means includes expansion means for subjecting the received transmitting image data to a predetermined data expansion before storage in said memory means.

14. The dynamic image transmission system as claimed in claim 12 wherein said reception means includes a modem for demodulating the received transmitting image data.

15. The dynamic image transmission system as claimed in claim 12 which further comprises display means for displaying an image of the received transmitting image data.

16. A dynamic image transmission system comprising:
input means for inputting image data of an input image;
memory means for storing the image data successively input from said input means and for storing transmitting image data which is to be transmitted;
detecting means for detecting each dynamic line in which corresponding picture element data of two successive frames stored in said memory means differ by more than a predetermined data change quantity;
transmission means for transmitting the image data stored in said memory means to a transmission path as the transmitting image data; and
control means for controlling operations of said detecting means and said transmission means during an image transmission mode so that image data related to a first frame of the input image is transmitted as the transmitting image data but only the image data of each dynamic line is transmitted as the transmitting image data with respect to second and subsequent frames;
said transmission means transmitting the image data of one frame by a first predetermined interlace when a number of dynamic lines within said one frame exceeds a predetermined number and transmits the image data of another frame by a second predetermined interlace when a number of dynamic lines within said other frame is less than or equal to said predetermined number.

17. The dynamic image transmission system as claimed in claim 16 wherein said first and second predetermined interlaces are the same.

18. The dynamic image transmission system as claimed in claim 16 wherein said first and second predetermined interlaces are mutually different.

19. The dynamic image transmission system as claimed in claim 18 wherein said first predetermined interlace is a 1/m interlace and said second predetermined interlace is a 1/n interlace, where m is greater than n.

20. A dynamic image transmission system comprising:
input means for inputting image data of an input image;
memory means for storing the image data successively input from said input means and for storing transmitting image data which is to be transmitted;
detecting means for detecting each dynamic line in which corresponding picture element data of two successive frames stored in said memory means differ by more than a predetermined data change quantity;
transmission means for transmitting the image data stored in said memory means to a transmission path as the transmitting image data; and
control means for controlling operations of said detecting means and said transmission means during an image transmission mode so that image data related to a first frame of the input image is transmitted as the transmitting image data but only the image data of each dynamic line is transmitted as the transmitting image data with respect to second and subsequent frames;
said detecting means including comparing means for successively comparing corresponding picture element data making up the image data of the two successive frames stored in said memory means, accumulating means for accumulating a difference between two corresponding picture element data for all of the picture element data, and defining means for defining the dynamic line in which an absolute value of the difference is greater than the predetermined value.

21. The dynamic image transmission system as claimed in claim 20 wherein said accumulating means accumulates the difference in a form of a histogram taken along each line of the input image.

22. A dynamic image transmission system comprising:
    input means for inputting image data of an input image;
    memory means for storing the image data successively input from said input means and for storing transmitting image data which is to be transmitted;
    detecting means for detecting each dynamic line in which corresponding picture element data of two successive frames stored in said memory means differ by more than a predetermined data change quantity;
    transmission means for transmitting the image data stored in said memory means to a transmission path as the transmitting image data;
    control means for controlling operations of said detecting means and said transmission means during an image transmission mode so that image data related to a first frame of the input image is transmitted as the transmitting image data but only the image data of each dynamic line is transmitted as the transmitting image data with respect to second and subsequent frames; and
    data processing means including first means for comparing picture element data of two mutually adjacent lines with respect to all lines in the first frame, second means for accumulating a difference between the picture element data of the two mutually adjacent lines, third means for generating a line identification code indicative of a position of each line within the frame, and fourth means for generating a no-change code when an absolute value of the difference is less than a predetermined threshold level.

23. The dynamic image transmission system as claimed in claim 22 wherein said transmission means includes compression means for subjecting the transmitting image data to a predetermined data compression before transmission, said transmission means transmitting only the no-change code together with the line identification code when said no-change code is generated by said fourth means.

24. A dynamic image transmission system comprising:
    input means for inputting image data of an input image;
    memory means for storing the image data successively input from said input means and for storing transmitting image data which is to be transmitted;
    detecting means for detecting each dynamic line in which corresponding picture element data of two successive frames stored in said memory means differ by more than a predetermined data change quantity;
    transmission means for transmitting the image data stored in said memory means to a transmission path as the transmitting image data; and
    control means for controlling operations of said detecting means and said transmission means during an image transmission mode so that image data related to a first frame of the input image is transmitted as the transmitting image data but only the image data of each dynamic line is transmitted as the transmitting image data with respect to second and subsequent frames;
    said transmission means including means for generating a line identification code indicative of a position of each line within the frame, and means for generating a no-change code when an absolute value of a difference between the picture element data of two mutually adjacent lines of a frame is less than a predetermined threshold level, said transmission means transmitting the line identification code and the no-change code to the transmission path in place of the image data of lines other than the dynamic lines.

* * * * *